(12) United States Patent
Lee

(10) Patent No.: US 7,821,423 B2
(45) Date of Patent: Oct. 26, 2010

(54) PARKING CONTROL SYSTEM AND METHOD

(75) Inventor: Bang-Hoon Lee, Gyeonggi-do (KR)

(73) Assignee: Visionride Inc, Gyeonggi-do (KR)

( * ) Notice: Subject to any disclaimer, the term of this patent is extended or adjusted under 35 U.S.C. 154(b) by 327 days.

(21) Appl. No.: 12/095,558

(22) PCT Filed: Dec. 1, 2006

(86) PCT No.: PCT/KR2006/005145

§ 371 (c)(1),
(2), (4) Date: May 30, 2008

(87) PCT Pub. No.: WO2007/064168

PCT Pub. Date: Jun. 7, 2007

(65) Prior Publication Data

US 2008/0258935 A1    Oct. 23, 2008

(30) Foreign Application Priority Data

Dec. 2, 2005   (KR) ................. 10-2005-0116880
Sep. 14, 2006  (KR) ................. 10-2006-0088908

(51) Int. Cl.
  *B60Q 1/48* (2006.01)
  *G06K 9/00* (2006.01)
  *G07B 15/00* (2006.01)
(52) U.S. Cl. ............... 340/932.2; 340/995.19; 382/104; 382/105; 348/148; 705/13; 705/418
(58) Field of Classification Search ............... 340/932.2
See application file for complete search history.

(56) References Cited

U.S. PATENT DOCUMENTS

| 5,504,314 A | 4/1996 | Farmont |
| 6,340,935 B1 | 1/2002 | Hall |
| 6,426,708 B1 * | 7/2002 | Trajkovic et al. ......... 340/932.2 |
| 6,650,250 B2 | 11/2003 | Muraki |
| 7,119,674 B2 * | 10/2006 | Sefton ..................... 340/521 |
| 2004/0222903 A1 | 11/2004 | Li |
| 2005/0083212 A1 | 4/2005 | Chew |

* cited by examiner

FOREIGN PATENT DOCUMENTS

| JP | 2003-233898 | 8/2003 |
| JP | 2005-190448 | 7/2005 |
| KR | 1020020085040 | 11/2002 |

OTHER PUBLICATIONS

International Search Report mailed Feb. 26, 2007; PCT/KR2006/005145.

*Primary Examiner*—Donnie L Crosland
(74) *Attorney, Agent, or Firm*—Ladas & Parry LLP

(57) ABSTRACT

A parking control system and method provides a total parking control system and method which are capable of automatically managing and controlling a whole process from a time when a vehicle enters a parking lot to a time when it goes out of there by using a server incorporating therein a program for a very high speed image recognition technique and parking management. The apparatus provides a parking location search unit which manages a parking location of an individual vehicle by recognizing vehicle numbers by photographing vehicles entering a parking space and going out of there as well as parked vehicles, and provides related information upon search. The apparatus further provides a parking guiding unit guiding a driver of a vehicle entering the parking lot to an empty place for parking.

14 Claims, 7 Drawing Sheets

PARKING CONTROL SYSTEM AND METHOD

TECHNICAL FIELD

The present invention relates to a parking control system, and more particularly, to a total parking control system with enhanced convenience and stability by enabling automatic guidance for entry of vehicles into a parking lot and exit of vehicles therefrom and also improving watch function.

BACKGROUND ART

It is a recent trend that vehicles are explosively increasing, and extra-large buildings capable of parking plenty of vehicles and parking buildings are increasing. Therefore, there has been continuously a need for efficient parking management. However, the existing parking systems are known to be insufficient for efficiency and convenience. For instance, in case of large parking lot or place of department or mart, it is not easy for a vehicle to enter such a parking lot and then find out an empty zone for parking therein and for its driver to find out a location of the parked vehicle. Thus, unnecessary driving is required for parking, so that much time may be sometimes taken for finding out the parked vehicle. In order to solve these problems, in case of the large parking lot, many parking attendants are disposed for efficient management and for maintaining sooth vehicle flow. This requires payment for the corresponding cost of labor, which has become a factor of cost increase. Moreover, this method fails to perfectly solve the above-mentioned problems, such as finding out the empty zone for parking and finding out the location of the parked vehicle.

Accordingly, there is a need for a total parking control system which provides more convenience and stability to both user and administrator.

DISCLOSURE

Technical Problem

It is, therefore, an object of the present invention to provide a parking control system with enhanced convenience, efficiency and stability.

Another object of the present invention is to provide a parking control method employing the improved parking control system.

The other objectives and advantages of the invention will be understood by the following description and will also be appreciated by the embodiments of the invention more clearly. Further, the objectives and advantages of the invention will readily be seen that they can be realized by the means and its combination specified in the claims.

Technical Solution

In accordance with one aspect of the present invention, there is provided a parking control system including: a photographing unit installed at an entrance of a parking lot for photographing vehicles entering the parking lot for identification thereof; a photographing unit installed at an exit of the parking lot for photographing vehicles getting out of the parking lot for identification thereof; an inner photographing unit disposed to photograph at least a current parking status for each unit compartment within the parking lot and identification information of parked vehicles; a server unit incorporating a database including at least an overall layout of the parking lot and a parking management program therein, wherein the server unit receives and stores the photographed information provided by the photographing units for photographing vehicles entering the parking lot and getting out of there, receives and stores the information photographed by the inner photographing, settles a parking fee, stores at least the number of vehicles entering the parking lot and getting out of there, parking time and parking position based on the received photographed information, and derives information on individual unit compartment available for parking and information on a total number of currently parked vehicles; a management terminal connected to the server unit; a parking guidance screen installed at a place where a driver of vehicle entering the parking lot can identify for displaying the layout of the parking lot, wherein a unit compartment currently available for parking and a path for going to the unit compartment are displayed; a search terminal connected to the server unit for providing a display screen for displaying parking information having a parking position to be searched and a path for going thereto upon input of information of the parked vehicle and/or for providing the parking information as voice; and a guidance screen for exit of the parked vehicle for photographing congestion status of a center or booth for settlement of a parking fee and conditions of outside road upon exit of the vehicle to display the photographed information for a driver of the vehicle.

Preferably, each of the photographing units for photographing vehicles entering the parking lot and getting out of there and the inner photographing unit includes: a camera for photographing vehicles entering the parking lot and getting out of there and parked vehicles; and a vehicle number identifying module.

Further, the photographing units for photographing vehicles entering the parking lot and getting out of there are provided with a plurality of appearance photographing cameras for photographing the appearances of the vehicles to identify a change in the appearances of the vehicles during the parking.

Furthermore, it is preferred that the parking control system further includes a plurality of search terminals connected to the server unit, and upon input of instruction for search, at least parking information having parking position information on vehicles to be searched is provided through the management terminal and the plurality of search terminals.

The parking information corresponds to display screen including a path for going to the vehicles to be searched and/or voice information thereon.

Preferably, the parking management program stored in the server unit includes a program code for multi-window function so that the management terminal enables at least multi-display and/or multi-tasking with respect to a plurality of parking zones.

Preferably, the management terminal displays vehicles parked for a long term in different colors upon displaying a whole or part of the parking zones, the different colors being displayed depending on a parking period of each vehicle parked for a long term.

More preferably, the server unit, the management terminal and the search terminal are connected over the network, which is connected to the Internet.

In addition, the parking control system further includes a fixed and/or mobile terminal which is connected to the network by wire/wireless or to the network over the Internet for searching parking information including parking position of each vehicle and/or monitoring parking status thereof, and for remotely operating the system and repairing a trouble therein by remote operation.

Preferably, the parking control system further includes an inner photographing unit for photographing status of each of a plurality of centers for settlement of a parking fee upon exit of vehicles, one or more outer photographing units for photographing road conditions outside the parking lot, and a guidance screen for displaying the outside road conditions photographed by the inner photographing unit and the outer photographing units for drivers of vehicles getting out of the parking lot.

Moreover, it is preferred that the inner photographing unit photographs a vehicle being parked and stores the photographed information.

In accordance with another aspect of the present invention, there is provided a method employing the parking control system as described above, including the steps of: photographing at least the number of a vehicle entering a parking lot and storing photographed information for identification thereof; guiding a unit compartment currently available for parking and a parking path on a layout of the parking guidance screen installed at a place where a driver of the vehicle entering the parking lot can identify; photographing the parked vehicle through the inner photographing unit and storing a parking position by identifying the vehicle number; when a signal for search is inputted by the management terminal and/or search terminal, providing from the terminal parking information including the parking position information of vehicle to be searched; notifying a driver of a vehicle getting out of the parking lot of congestion status of the center for settlement of the parking fee and outside road conditions through the guidance screen; photographing at least the number of vehicle getting out of the parking lot for identification thereof; deriving a parking time and fee information with respect to the vehicle getting out of the parking lot, and performing settlement; and upon receipt of instruction allowing the parked vehicle to get out of the parking lot, permitting the vehicle to get out of there.

Preferably, the parking control method further includes the step of updating, after the step of photographing the vehicle entering the parking lot, the step of permitting the vehicle to get out of the parking lot and the step of storing the parking position, a portion of the parking information including the total number of parked vehicles, parking time information and parking position in real times.

Preferably, the photographing steps for photographing vehicles entering the parking lot and getting out of there photograph the appearances of the vehicles by using the plurality of appearance photographing cameras to identify a change in the appearances of the vehicles during the parking.

Preferably, the parking guidance step is performed by providing a driver of the vehicle entering the parking lot with a unit compartment available for parking and a parking path through a display screen and/or a voice thereon.

Preferably, the parking information providing step, upon input of information of the parked vehicle to be searched, provides the parking position of the vehicle and the path for going to the parking position via the display screen and/or a voice thereon.

The vehicles parked for a long term are displayed in different colors through the management terminal upon displaying a whole or part of the parking zones, the different colors being displayed depending on a parking period of each vehicle parked for a long term.

Preferably, the status of each of the centers for settlement of the parking fee photographed by the inner camera and the outside road conditions photographed by the outer camera are displayed through the guidance screen.

Advantageous Effects

As mentioned above and will be described below, the parking control system and method of the invention can automatically identify vehicles by employing a very high speed image recognition technique and allows vehicles entering a parking lot and getting out of there to do so rapidly, thereby enabling the sooth flow of vehicles. In addition, with respect to parked vehicles, the system and method of the invention identify the number of the vehicles and establish a database on the information, which permit the same to be perfectly managed and searched. Especially, the parking management system of the invention provides a monitoring service over the Internet to thus provide more convenience to the user. Moreover, the parking control system and method of the invention guide the vehicles entering the parking lot of unit compartments available for parking through detailed layout thereof, thereby optimizing the flow of vehicles within the parking lot as well as providing convenience to the user. Furthermore, the parking control system and method of the invention can quickly and accurately solve the problem of mischance that may happen during the parking by photographing the appearances of vehicles entering the parking lot and getting out of there and then storing the photographed information. The parking control system and method of the invention as set forth above can efficiently utilize a limited parking space, so that the user can use it with more convenience and reliability.

DESCRIPTION OF DRAWINGS

The above and other objects and features of the present invention will become apparent from the following description of the preferred embodiments given in conjunction with the accompanying drawings, in which.

BEST MODE FOR THE INVENTION

Hereinafter, preferred embodiments of the present invention will be set forth in detail with reference to the accompanying drawings.

Figure 1:
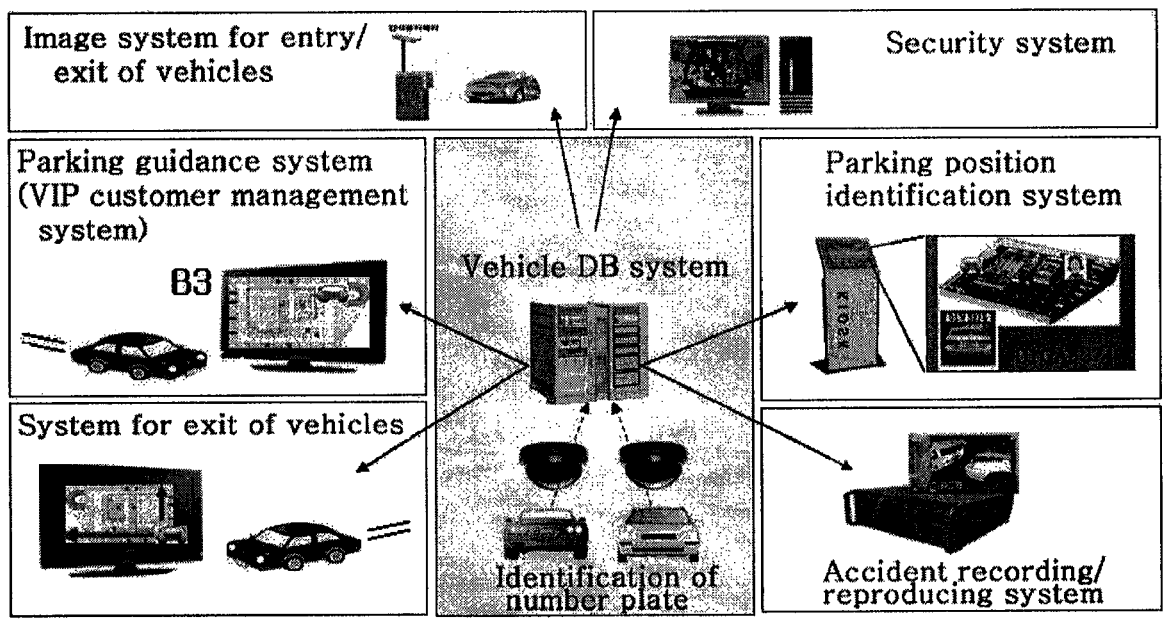
FIG. 1 schematically illustrates various services offered by a parking control system in accordance with the present invention.

FIG. 1 schematically illustrates various services offered by a parking control system in accordance with the present invention.

Referring to FIG. 1, the present invention provides a parking control system and method which enable an automatic management and control from a time when a vehicle enters a parking lot to a time when it gets out of there by using a server that incorporates therein a very high speed image recognition technique and a parking management program. For this, the present invention employs a parking position search system which manages parking positions of individual vehicles by identifying vehicle numbers by means of photographing vehicles that enter the parking lot and get out of there as well as parked vehicles, and offers the required information upon searching thereof. The present invention further uses a parking guidance system that guides a driver of a vehicle entering the parking lot to an empty space available for parking. In the foregoing description, if a vehicle number is not identified for an arbitrary parking space, it can be identified as an empty zone available for parking. Further, in addition to identifying the number of vehicles entering the parking space and getting out of there, the present invention adopts an accident confirmation system which photographs the appearance of each of the vehicles and storing the photographed images therein for accident confirmation during the parking. Besides, the present invention employs a long-term parking vehicle management system, and also uses a vehicle protection system for photographing the parked vehicles and storing the photographed images. Also, the present invention adopts a guidance system for vehicles getting out of the parking lot for notifying the drivers of the vehicles of status of each of a plurality of centers for settlement of a parking fee and conditions of outside road. Finally, the present invention has a structure that can monitor the parked vehicles by connection with wire/wireless network including the Internet and the like, and remotely control and repair the parking system when a trouble happens therein.

Figure 2:
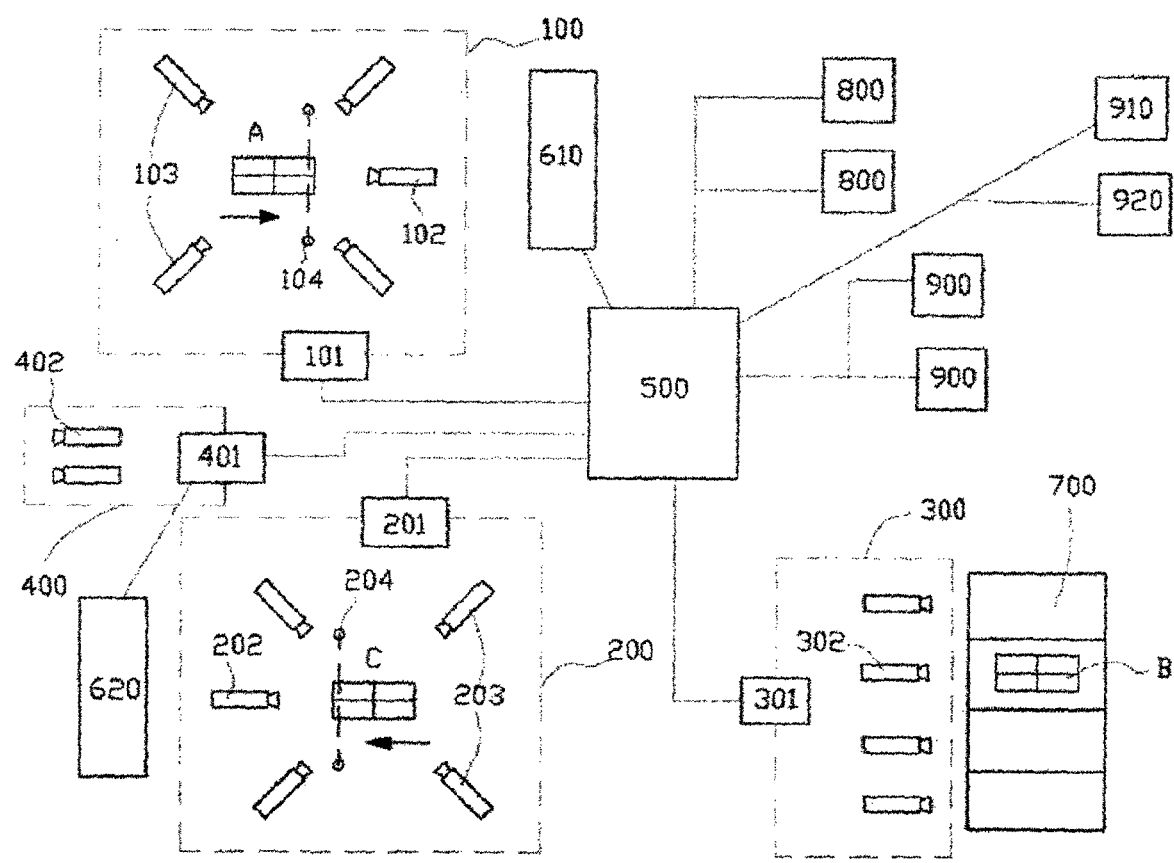
FIG. 2 illustrates an overall structure of the parking control system in accordance with a preferred embodiment of the present invention.

FIG. 2 illustrates an overall structure of the parking control system in accordance with a preferred embodiment of the present invention.

Referring to FIG. 2, the parking control system basically includes a photographing unit 100 for photographing vehicles entering a parking lot, a photographing unit 200 for photographing vehicles getting out of there, a parking status guidance screen 610, an inner photographing unit 300 and a server unit 500.

The photographing unit 100 for photographing vehicles entering the parking lot and the photographing unit 200 for photographing vehicles getting out of there preferably include sensors 104 and 204 for sensing vehicles A and C entering the parking lot and getting out of there, for example, sensors such as infrared rays sensors, cameras 102 and 202 for photographing vehicles entering the parking lot and getting out of there in response to signals sensed by the sensors 104 and 204, and vehicle number identifying modules, respectively. Each of the vehicle number identifying modules employs a technique that identifies images at a very high speed, that is, captures and scans images and identifies characters therefrom. In addition, there is the use of a technique of selecting an identification object region from the whole captured images. Preferably, the vehicle number identification modules may be included in control boxes 101 and 201 having an image capture board, an image control board and an identification software. These control boxes 101 and 201 may be embedded in a separate PC or in the server unit 500 to be described later. Further, these control boxes 101 and 201 may be configured with a control box 301 of the inner photographing unit 300 to be described later as a single body. Also, the control boxes 101, 201, and 301 may be structured together as a single body.

When vehicles A and C enter an entrance/exit for entry into the parking lot or exit therefrom, the sensors 104 and 204 first sense the status and then send a signal to each of the control boxes 101 and 201. The control boxes 101 and 201 operate the cameras 102 and 202 for photographing vehicles entering the parking lot and getting out of there, and identify the number, symbol or character of vehicle number plate. The identified number, symbol or character of vehicle number plate is sent to the server unit 500 and then stored therein. And, each of the photographing units 100 and 200 for photographing vehicles entering the parking lot and getting out of there may identify the vehicle number by identifying the movement of vehicles when there occurs a change by comparison of images after and before photographing without using the separate sensors 104 and 204.

Preferably, a plurality of appearance photographing cameras 103 and 203 for photographing the appearances of the vehicles A and C entering the parking lot and getting out of there are prepared at the entrance/exit. By such a structure, the appearance images of the vehicles entering the parking lot and getting out of there are compared, so that the appearance change of vehicles can be identified during the parking. Preferably, each of the appearance photographing cameras 103 and 203 is provided with at least 2 to 4 cameras for photographing vehicles in three dimensions on all sides. The images photographed by the appearance photographing cameras 103 and 203 are stored in the control boxes 101 and 201 or the server unit 500, or captured and then stored therein. This storage of appearance images photographed during the entry/exit of vehicles helps solve a problem of accidents that may happen during the parking. For instance, when a scratch occurs in a vehicle, the appearance images can be primarily used as judgment/evidence documents as to whether such a scratch occurs inside or outside the parking lot. Further, in case of synthetically comparing results of the inner photographing unit 300 to be described later, and records such as scratch direction and parking time, the causal relationship therebetween can be clarified more easily based on the appearance images.

Once the number of vehicle number plate, symbol or character is identified by the photographing units 100 and 200 for photographing vehicles entering the parking lot and getting out of there, the results are stored in a database prepared in the server unit 500. In this case, the total number of parked vehicles in the parking lot is updated in the database, and information about entry times of those vehicles into the parking lot is stored therein in real times. The server unit 500 may incorporate a parking management program therein, in addition to the database.

The inner photographing unit 300 is arranged to photograph at least current parking status and the identification information of a parked vehicle B every unit compartment within the parking lot. This inner photographing unit 300 is provided with a plurality of cameras 302 and a vehicle number identification module in the control box 301 as described above, wherein details thereof will be omitted for simplicity. The number, symbol or character of vehicle number plate so identified is stored in the database of the server unit together with the parking position.

Figure 3:
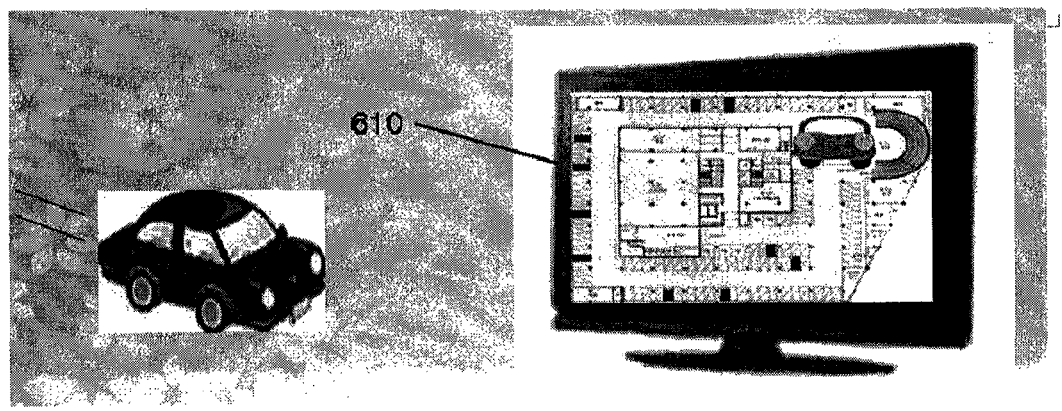
FIG. 3 represents a parking status guidance screen for parking guidance adopted in the parking control system in accordance with the present invention.

FIG. 3 represents a parking status guidance screen for parking guidance provided in the parking control system in accordance with the present invention.

With reference to FIGS. 2 and 3, when a vehicle enters via an entrance, the parking management program provided in the server unit 500 displays unit compartments available for parking on the parking status guidance screen 610. Preferably, the unit compartments available for parking as well as layout are displayed, for example, in a red flicking manner. At this time, when the vehicle moves to a location available for parking, a bright light representing a space available for parking, for example, guidance light such as green light or white light is emitted, thereby readily finding out the space available for parking. By this structure, the driver can find out the empty space available for parking immediately, without wandering the parking lot. Moreover, in case of large parking, an additional effect of making smooth flow can be obtained automatically.

When parking is made in a parking unit compartment 700, the above-mentioned inner photographing unit 300 photographs and identifies a vehicle number of the parked vehicle B, and updates information stored in the database of the server unit 500.

The server unit 500 includes at least the database having the whole parking lot layout and a server incorporating the parking management program therein. Therefore, the server unit 500 receives and stores the photographed information containing image information from the photographing units 100 and 200 for photographing vehicles entering the parking lot and getting out of there, and receives and stores the photographed information having image information of the inner photographing unit 300. At least the vehicle numbers of vehicles entering the parking lot and getting out of there, parking times and parking positions as well as the image information are stored in the database based on the received photographed information. The parking management program extracts the individual unit compartments available for parking and information about the total number of currently parked vehicles from the stored information. These information stored in the database are preferably updated in real times. Further, it may be embodied in a manner that since the amount of data of the image information may be very large, the information is stored in the control boxes 101, 201 and 301 and only the residual photographed information is extracted and stored in the server unit 500.

Figure 4:
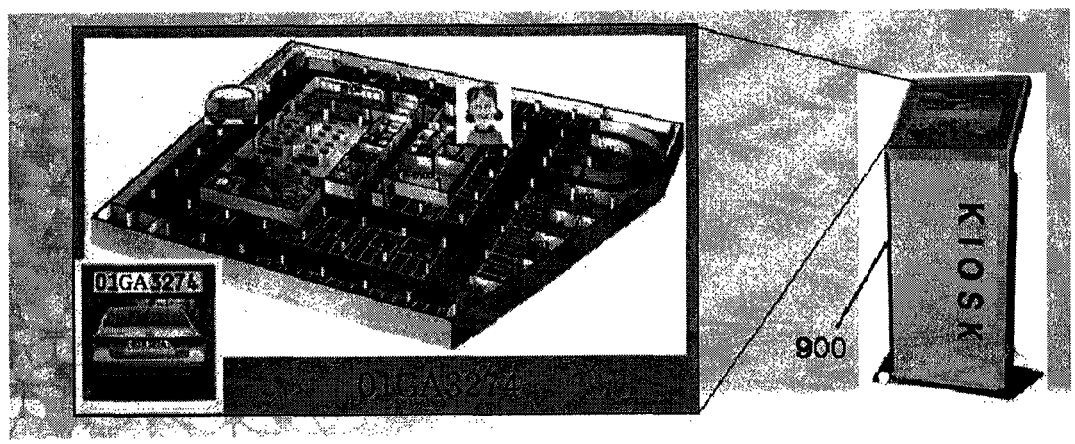
FIG. 4 shows a search terminal employed in the parking control system in accordance with the present invention.

FIG. 4 shows a search terminal employed in the parking control system in accordance with the present invention.

Referring to FIGS. 2 and 4, the parking control system of the present invention is provided with a plurality of search terminals, e.g., 900, coupled with the server unit 500. Through the search terminal 900, search information including at least parking position information on vehicles to be searched is provided upon input via a touch screen or by voice for search. The display screen of the search terminal 900 including a path for going to vehicles to be searched may be kiosk, PC, wireless terminal, home gate or home server. Further, the parking information may be preferably provided as voice information. Specifically, when a searcher inputs a vehicle number via an input unit of the search terminal 900, the parking lot layout in which parking positions of vehicles to be searched and a current position of the searcher are marked is displayed on the display screen of the search terminal 900. More preferably, a shortest path line connecting the two positions may be displayed together.

FIGS. 5A to 5D illustrate monitor screens of management terminals provided in the parking control system in accordance with the present invention.

Referring to FIGS. 2, and 5A, 5B and 5C, the parking control system of the present invention includes a plurality of management terminals 800.

Figure 5A:
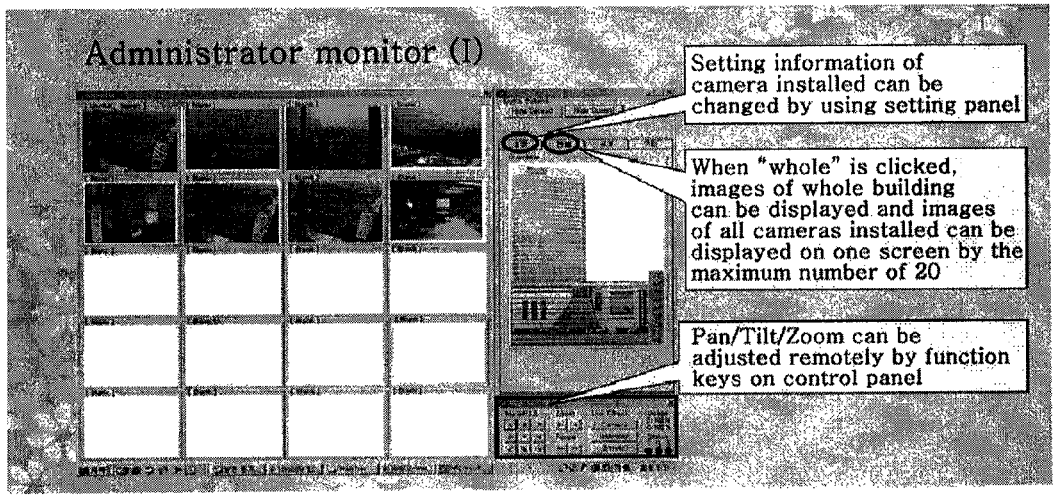
FIGS. 5A to 5D illustrate monitor screens of management terminals provided in the parking control system in accordance with the present invention.
Figure 5B:
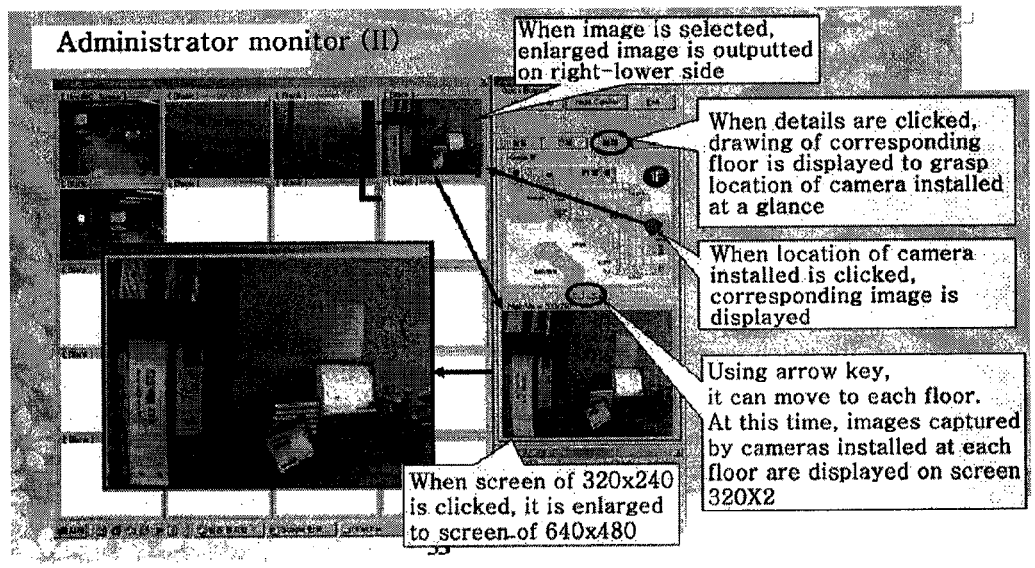

The parking management program incorporated in the server unit 500 has a program code for multi-window function. Therefore, as depicted in FIGS. 5A and 5B, the management terminal 800 can be implemented in at least multi-display screens using GUI map. With respect to a plurality of parking zones, multi-display and/or multi-tasking can be performed. The administrator can do monitoring and management under the state of sending screens of diverse parking zones up via a monitor of the single management terminal 800.

Figure 5C:
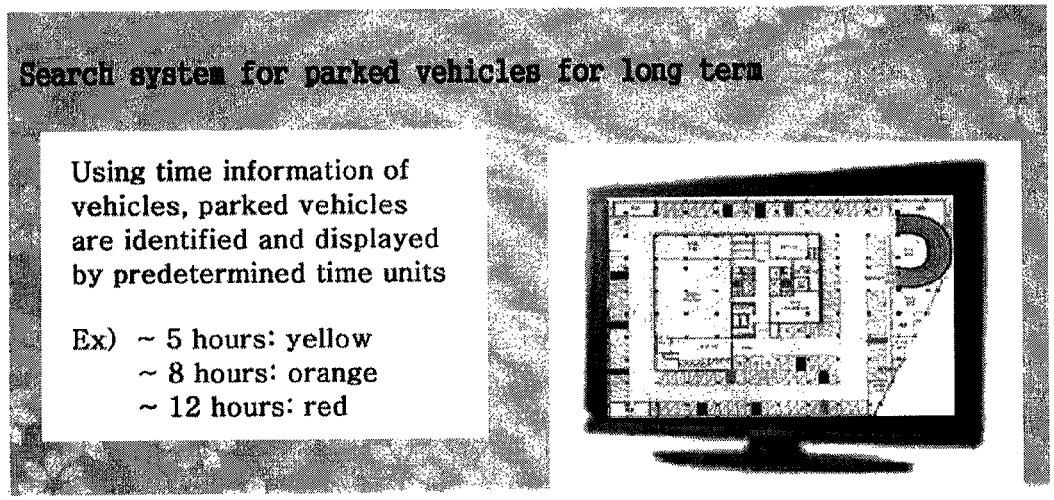

As shown in FIG. 5C, it is preferable to make at least indications capable of identifying long-term parking vehicles marked on the management terminal 800. Thus, in case of displaying a total or part of parking zones through the management terminal 800, different colors, for example, yellow, orange and red may be used for long-term parking vehicles within target parking zones. These colors may be used on the basis of parking period of time. For example, more than 5 hours parked vehicles may be set as yellow, more than 8 hours parked vehicles as orange, and more than 12 hours parked vehicles as red. By doing so, the long-term parking vehicles can be easily distinguished from one another. By this configuration, an inconvenience task of identifying the long-term parking vehicles while the administrator looks for them one by one is no longer required.

Figure 5D:
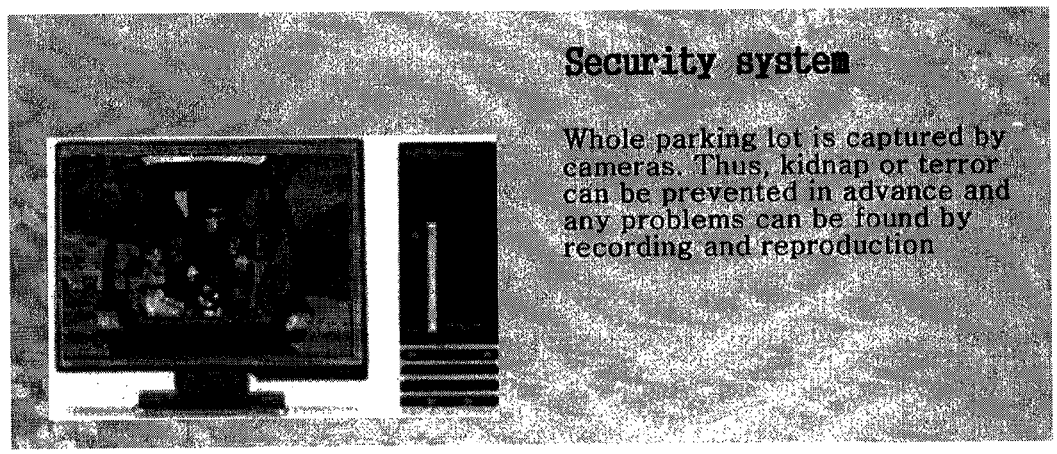

As shown in FIG. 5D, the parking control system of the present invention photographs the parking lot inside with the plurality of cameras, thereby providing a security system with more stability.

Referring back to FIGS. 1 and 2, the parking control system of the present invention provides a monitoring service over the Internet. For this, the server unit 500, the management terminal 800 and the search terminal 900 of the present invention are connected over a network including a wire/wireless Internet and so on.

Therefore, it is possible to connect any in other places within the building to which the parking lot belongs to the same network by wire/wireless, or search parking information having parking positions of individual vehicles and/or monitor parking status through the fixed terminal 910 and/or a mobile terminal 920 connected to the same network over the Internet. For example, using the mobile communication terminal 920 can be connected to the server unit 500 over the Internet connection, thereby making it possible to monitor moving images of the parked vehicles. For monitoring, a vehicle number is inputted, as in search via the kiosk mentioned above. Then, the management program of the server unit 500 extracts the parking information of a corresponding vehicle from the database. Next, the corresponding vehicle is photographed by the inner photographing camera 302 closest to its parking position, and photographed image is sent. The parking information relating to the parking time and parking position of the vehicle may be provided together with the image. Further, when the parking information is clicked where necessary, for example, a layout in which a path for going to the parked vehicle is marked may be displayed. By this configuration, the user of the parking lot can monitor the parked vehicle at any time, and can know information about the parking times and positions of the currently parked vehicles.

Figure 6:
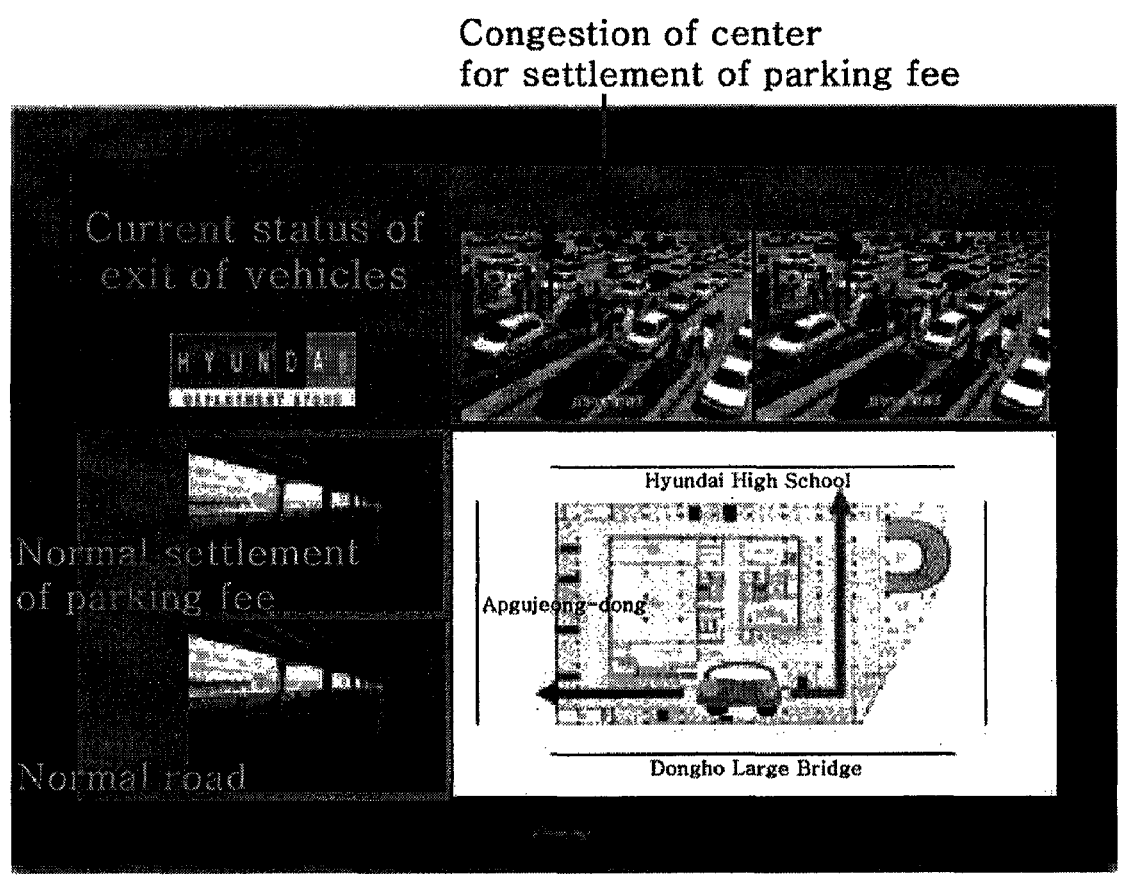
FIG. 6 offers a status guidance screen for guiding vehicles getting out of the parking lot provided in the parking control system in accordance with the present invention.

In addition, the parking control system of the present invention includes a guidance structure for exit of vehicles, notifying the driver of the vehicle C getting out of the parking lot of the status of each of a plurality of centers for settlement of a parking fee and conditions of outside road. This can be accomplished by using at least one outer photographing unit 400 that photographs the road conditions outside the parking lot and a status guidance screen 620 that displays the outside road conditions photographed by the outer photographing unit 400 for the driver of the vehicle getting out of the parking lot. The status guidance screen 620 may display the status of each of the plurality of centers for settlement of the parking fee at once. An example of this status guidance screen 620 is exemplified in FIG. 6. The outer photographing unit 400 may also be constituted by an outer photographing camera 401 and a control box 402.

Preferably, the photographed contents may be stored through the inner photographing unit 300 so that the required contents can be reproduced when necessary. The contents photographed by the inner photographing unit 300 may be recorded, examples of which are contact accidents which may occur during parking or occurrence conditions such as stolen accidents. This structure leads to rapid accurate problem resolution, and also to psychological protective effect.

Figure 7:
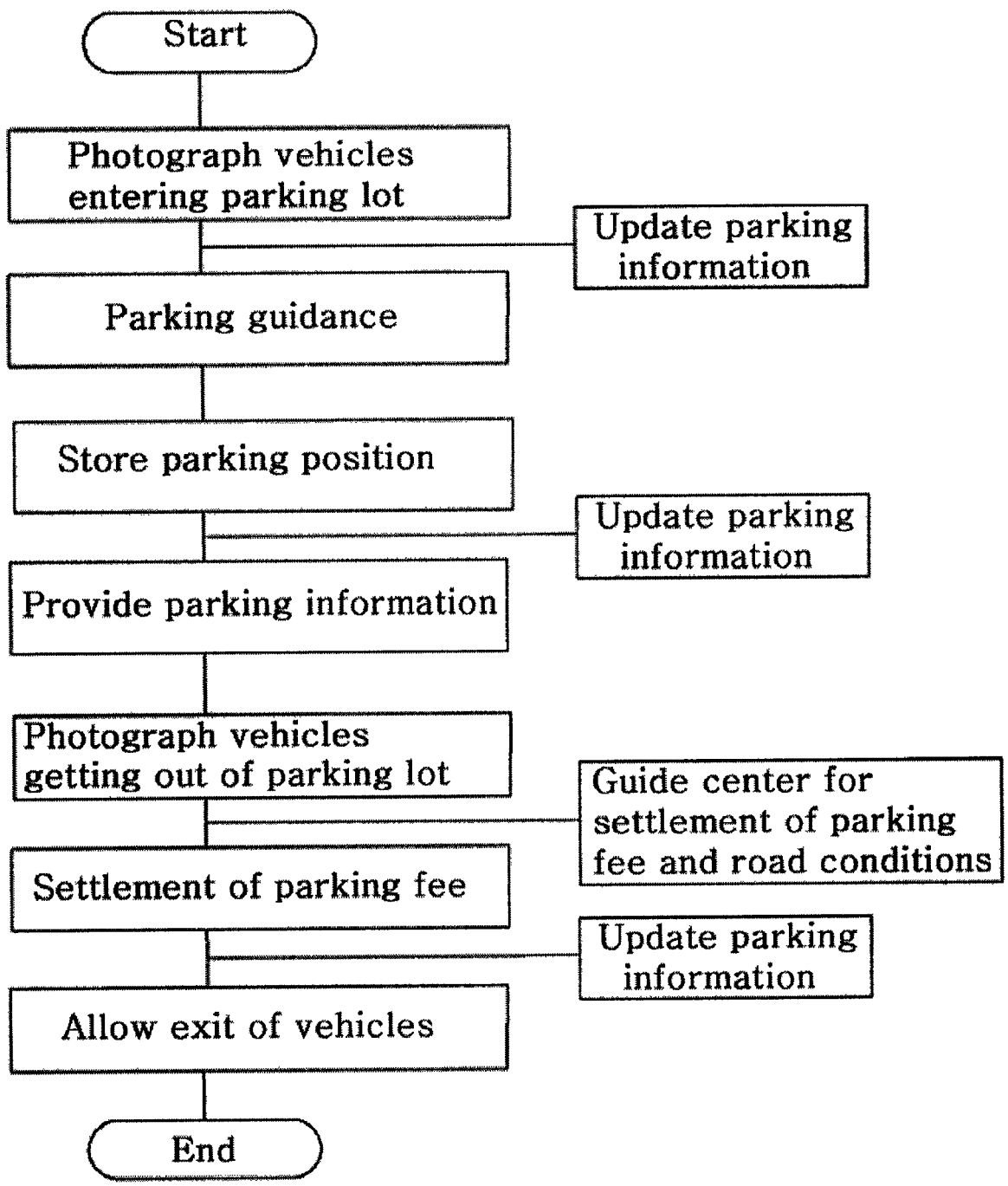
FIG. 7 illustrates a flowchart for explaining a parking control method in accordance with another embodiment of the present invention.

Hereinafter, a parking control method in accordance with another preferred embodiment of the present invention will be described in detail with reference to FIG. 7. FIG. 7 illustrates a schematic flowchart for explaining the parking control method of the present invention.

The parking control method in accordance with another preferred embodiment of the present invention is a method using the parking control system as discussed so far.

First of all, the parking control method of the present invention includes the step of photographing a vehicle entering a parking lot for identifying at least its vehicle number. As set forth above, an image is captured by the photographing unit 100 for photographing a vehicle entering the parking lot including the control box 101 with the photographing camera 102 for the above purpose and the vehicle number identification module for identifying the vehicle number. The captured image is then identified to derive character. Thereafter, the identified vehicle number is stored in the database of the server unit 500. This corresponds to the step of updating a total number of vehicles available for parking in real times.

Preferably, the step for photographing the vehicle entering the parking space photographs the appearance of the vehicle by the plurality of appearance photographing cameras 203, and stores images on the appearance of the vehicle or captured images upon entry thereof into the parking lot.

Subsequently, the parking control method includes the step of guiding a parking path via the parking guidance screen 610 while allowing the entry of the vehicle into the parking lot. The parking guidance screen 610 preferably adopts a large-sized screen which is located at a suitable place for a driver of the vehicle entering the parking lot to view it at a glance. Further, it is preferred that the parking guidance screen 610 is installed at an entrance of each floor if the parking lot is composed of a plurality of floors, and a path for going thereto is displayed with the layout of a corresponding floor.

Upon completion of parking, the step of photographing a vehicle number of the parked vehicle B to be identified through the inner photographing unit 300 and storing its parking position is performed. The identification and storage of the vehicle number are carried out in the same way as the above-mentioned photographing step for entry of the vehicle.

When a search number is inputted through the management terminal 800 and/or search terminal 900, the step of providing the parking information of a vehicle to be searched via the corresponding terminal is performed. The parking information is search information including the parking position information of the vehicle to be searched. This is obtained by providing display screen containing a path for going to the vehicle to be searched and/or voice information thereon. The search terminal may be embodied by using, for example, a plurality of kiosks installed in the parking lot.

Further, the server unit 500, the management terminal 800 and the search terminal 900 are connected over the network which is also connected over the Internet so that the user can search and monitor the parked vehicle from the outside through the fixed terminal 910 and/or mobile terminal 920 via the Internet.

Preferably, the management terminal 800 displays at least parked vehicles for a long period of term within target zones in different colors upon display of a total or part of parking zones. The different colors are displayed for the parked vehicles depending on the parking period of time for distinguishing from one another.

Next, the step of photographing a vehicle getting out of the parking lot is carried out to identify at least a vehicle number thereof. Similarly, the number of the vehicle getting out of the parking lot is identified by the photographing unit 200 for exit of the vehicle and then stored, wherein its appearance is also photographed and stored.

Then, the step of settling a parking fee is performed. In this step, parking time and fee information for the vehicle getting out of the parking lot are obtained and the fee is settled. Upon completion of the settlement, information on the number of vehicles available for parking is automatically updated. With respect to the vehicles getting out of the parking lot, the parking time may be obtained and fee settlement therefor may be made in advance by kiosk or manless accounting machine.

Upon receipt of instruction allowing the exit of vehicle, the step of allowing the exit of vehicle C is performed. The instruction allowing the exit of vehicle may be provided automatically or manually by the administrator depending on whether settlement is made normally.

Preferably, the present invention may further include the step of displaying congestion status of each of a plurality of centers for settlement of a parking fee photographed by the inner camera and outside road conditions photographed by the outer camera through the status guidance screen 620 for the driver of vehicle getting out of the parking lot.

Further, as mentioned above, the step of updating any of the parking information including the total number of parked vehicles, parking time information and parking position in real times is carried out after each of the step of photographing the vehicle entering the parking lot, the step of allowing the exit of vehicle and the step of storing the parking position. Of course, this update of information may be made manually by the allowed management terminal 800.

While the present invention has been described with respect to certain preferred embodiments, it will be apparent to those skilled in the art that various changes and modifications may be made without departing from the scope of the invention as defined in the following claims.

What is claimed is:

1. A parking control system comprising:

a photographing unit installed at an entrance of a parking lot for photographing vehicles entering the parking lot for identification thereof;

a photographing unit installed at an exit of the parking lot for photographing vehicles getting out of the parking lot for identification thereof;

an inner photographing unit disposed to photograph at least a current parking status for each unit compartment within the parking lot and identification information of parked vehicles;

a server unit incorporating a database including at least an overall layout of the parking lot and a parking management program therein, wherein the server unit receives and stores the photographed information provided by the photographing units for photographing vehicles entering the parking lot and getting out of there, receives and stores the information photographed by the inner photographing, settles a parking fee, stores at least the number of vehicles entering the parking lot and getting out of there, parking time and parking position based on the received photographed information, and derives information on individual unit compartments available for parking and information on a total number of currently parked vehicles;

a management terminal connected to the server unit;

a parking guidance screen installed at a place where a driver of vehicle entering the parking lot can identify for displaying the layout of the parking lot, wherein a unit compartment currently available for parking and a path for going to the unit compartment are displayed;

a search terminal connected to the server unit for providing a display screen for displaying parking information having a parking position to be searched and a path for going thereto upon input of information of the parked vehicle and/or for providing the parking information as voice; and a guidance screen for exit of the parked vehicle for photographing congestion status of a center for settlement of a parking fee and conditions of outside road upon exit of the vehicle to display the photographed information for a driver of the vehicle.

2. The parking control system according to claim 1, wherein each of the photographing units for photographing vehicles entering the parking lot and getting out of there and the inner photographing unit comprises:

a camera for photographing vehicles entering the parking lot and getting out of there and parked vehicles; and a vehicle number identifying module.

3. The parking control system according to claim 1, wherein the photographing units for photographing vehicles entering the parking lot and getting out of there are provided with a plurality of appearance photographing cameras for photographing the appearances of the vehicles to identify a change in the appearances of the vehicles during the parking.

4. The parking control system according to claim 1, wherein the parking management program stored in the server unit includes a program code for multi-window function so that the management terminal enables at least multi-display and/or multi-tasking with respect to a plurality of parking zones.

5. The parking control system according to claim 4, wherein the management terminal displays vehicles parked for a long period of term in different colors upon displaying a whole or part of the parking zones, the different colors being displayed depending on a parking period of each vehicle parked for a long term.

6. The parking control system according to claim 4, wherein the server unit, the management terminal and the search terminal are connected over the network, which is connected to the Internet.

7. The parking control system according to claim 6, further comprising a fixed and/or mobile terminal which is connected to the network by wire/wireless or to the network over the Internet for searching parking information including parking position of each vehicle and/or monitoring parking status thereof, and for remotely operating the system and repairing a trouble therein by remote operation.

8. The parking control system according to claim 1, wherein the inner photographing unit photographs a vehicle being parked and stored the photographed information.

9. A method employing the parking control system of any of the preceding claims, comprising the steps of:

photographing at least the number of a vehicle entering a parking lot and storing photographed information for identification thereof;

guiding a unit compartment currently available for parking and a parking path on a layout of the parking guidance screen installed at a place where a driver of the vehicle entering the parking lot can identify;

photographing the parked vehicle through the inner photographing unit and storing a parking position by identifying the vehicle number;

when a signal for search is inputted by the management terminal and/or search terminal, providing from the terminal parking information including the parking position information of vehicle to be searched;

notifying a driver of a vehicle getting out of the parking lot of congestion status of the center for settlement of the parking fee and congestions of outside road through the guidance screen;

photographing at least the number of vehicle getting out of the parking lot for identification thereof;

deriving a parking time and fee information with respect to the vehicle getting out of the parking lot, and performing settlement; and upon receipt of instruction allowing the parked vehicle to get out of the parking lot, permitting the vehicle to get out of there.

10. The method according to claim 9, further comprising the step of updating, after the step of photographing the vehicle entering the parking lot, the step of permitting the vehicle to get out of the parking lot and the step of storing the parking position, a portion of the parking information including the total number of parked vehicles, parking time information and parking position in real times.

11. The method according to claim 9, wherein the photographing steps for photographing vehicles entering the parking lot and getting out of there photograph the appearances of the vehicles by using the plurality of appearance photographing cameras to identify a change in the appearances of the vehicles during the parking.

12. The method according to claim 9, wherein the parking guidance step is performed by providing a driver of the vehicle entering the parking lot with a unit compartment available for parking and a parking path through a display screen and/or a voice thereon.

13. The method according to claim 9, wherein the parking information providing step, upon input of the information of the parked vehicle to be searched, provides the parking position of the vehicle and the path for going to the parking position via the display screen and/or a voice thereon.

14. The method according to claim 9, wherein vehicles parked for a long period of term are displayed in different colors through the management terminal upon displaying a whole or part of the parking zones, the different colors being displayed depending on a parking period of each vehicle parked for a long term.

* * * * *